United States Patent Office 3,684,427
Patented Aug. 15, 1972

3,684,427
PROCESS FOR DYEING NITROGEN-CONTAINING FIBER MATERIALS WITH MIXTURES OF 1:2 METAL COMPLEX AZO AND ACID DYESTUFFS
Klaus Walz, Leverkusen, Manfred Baecker, Blecher, and Mathieu Quaedvlieg, Opladen, Germany, assignors to Farbenfabriken Bayer Aktiengesellschaft, Leverkusen, Germany
No Drawing. Filed Aug. 3, 1970, Ser. No. 60,737
Claims priority, application Germany, Aug. 7, 1969, P 19 40 178.6
Int. Cl. D06p 1/10
U.S. Cl. 8—26                                        6 Claims

ABSTRACT OF THE DISCLOSURE

Process for dyeing nitrogen-containing fibre materials with acid dyestuffs and 1:2 metal complex dyestuffs in the presence of amines containing glycol ether groups, characterised in that compounds of formula $$R-\overset{R_1}{\underset{|}{N}}-(CH_2-CH-O)_m-CH_2-CH_2-SO_3M$$

in which R represents a $C_{12}$-$C_{22}$-alkyl, $C_{12}$-$C_{22}$ alkenyl or $C_{12}$-$C_{22}$-cycloalkyl radical, $R_1$ represents a methyl group or one of the groupings $$-(CH_2-CH-O)_n-H \text{ or } -(CH_2-CH-O)_n-CH_2-CH_2-SO_3M$$
$$\underset{R_2}{|} \quad\quad\quad\quad\quad\quad \underset{R_2}{|}$$

$R_2$ represents hydrogen, or a methyl, ethyl or phenyl group, M denotes a cation, and the sum $m+n$ denotes a number from 5–70, with the proviso that at least 80% of the alkylene oxide units contained in the molecule are ethylene oxide units, or their quaternisation products of formula $$R-\overset{\overset{R_1}{|\oplus}}{\underset{\underset{R_3}{|}}{N}}-(CH_2-CH-O)_m-CH_2-CH_2-SO_3^{\ominus}$$
$$\quad\quad\quad\quad\quad\quad\quad \underset{R_2}{|}$$

in which R, $R_1$, $R_2$, m and n have the abovementioned significance and $R_3$ represents an optionally substituted $C_1$-$C_8$-alkyl group or aralkyl group, are used as amines containing glycol ether groups.

The invention relates to a process for dyeing nitrogen-containing fibre materials with acid dyestuffs and 1:2 metal complex dyestuffs in the presence of amines containing glycol ether groups; the process is characterised in that compounds of formula $$R-\overset{R_1}{\underset{|}{N}}-(CH_2-CH-O)_m-CH_2-CH_2-SO_3M \quad\quad I$$
$$\quad\quad\quad\quad\quad \underset{R_2}{|}$$

in which

R represents a $C_{12}$-$C_{22}$-alkyl, a $C_{12}$-$C_{22}$-alkenyl or $C_{12}$-$C_{22}$-cycloalkyl radical, $R_1$ represents a methyl group or one of the groupings $$-(CH_2-CH-O)_n-H \text{ or } -(CH_2-CH-O)_n-CH_2-CH_2-SO_3M$$
$$\underset{R_2}{|} \quad\quad\quad\quad\quad\quad \underset{R_2}{|}$$

$R_2$ represents hydrogen or a methyl, ethyl or phenyl group,

M denotes a cation, and the sum $m+n$ is a number from 5–70, preferably 15–50, with the proviso that at least 80% of the alkylene oxide units contained in the molecule are ethylene oxide units, or their quaternisation products of formula $$R-\overset{\overset{R_1}{|\oplus}}{\underset{\underset{R_3}{|}}{N}}-(CH_2-CH-O)_m-CH_2-CH_2-SO_3^{(-)}$$
$$\quad\quad\quad\quad\quad\quad\quad \underset{R_2}{|} \quad\quad\quad\quad\quad\quad\quad\quad\quad I$$

in which

R, $R_1$, $R_2$, m and n have the abovementioned significance and $R_3$ represents an optionally substituted $C_1$-$C_8$-alkyl group or aralkyl group, are used as amines containing glycol ether groups.

For R, the dodecyl, tetradecyl, hexadecyl, octadecyl eicosyl and docosyl radicals may for example be mentioned as $C_{12}$-$C_{22}$-alkyl radicals, and as $C_{12}$-$C_{22}$-alkenyl radicals especially the octadecenyl radical. Possible $C_{12}$-$C_{22}$-cycloalkyl radicals are above all the abietyl radical Possible cations for M are especially the alkali ions such as the sodium and potassium ion, the alkaline earth ions, such as the calcium and magnesium ion, and the ammonium ions, such as the ammonium ion or the ammonium ions which are derived from monoethanolamine diethanolamine and triethanolamine.

For $R_3$, lower alkyl groups, such as the methyl, ethyl n-propyl, i-propyl or sec.-butyl group, and also alkyl radicals substituted by a hydroxyl, carboxyl, lower carbalkoxy or carbonamide group, such as the 2-hydroxyethyl, 1-hydroxypropyl-2, carboxymethyl, carbethoxymethyl and carbonamidomethyl radical, may above all be mentioned as optionally substituted $C_1$-$C_8$-alkyl groups. Possible optionally substituted aralkyl radicals are, above all, the benzyl 4-methylbenzyl, 4-chlorobenzyl and the phenoxyethyl radical.

Products of the reaction of alkylene oxides, especially ethylene oxide or mixtures of ethylene oxide and up to 20% of higher alkylene oxides, such as propylene oxide butylene oxide or styrene oxide, with primary or secondary amines or such tertiary amines as contain a hydroxy group serve as starting materials for the compounds to be used according to the invention. As amines, there may for example be mentioned: dodecylamine, tetradecylamine hexadecylamine, octadecylamine, arachylamine, oleyl amine, abietylamine, hexadecylmethylamine, octadecyl methylamine, N - [β - hydroxyethyl]-methyl-hexadecyl amine, N - [β - hydroxyethyl]-methyl-octadecylamine, N [β-hydroxypropyl]-methyl-octadecylamine and N-[2-hydroxy-2-phenyl-ethyl]-methyl-octadecenylamine.

As representatives of the amines containing glycol ether groups, or their quaternisation products, to be used according to the invention, the compounds of Formulae nd II in which R, R₁, R₂, m and M have the significance indicated in the table which follows may be mentioned:

polyacrylonitriles, but especially natural polyamides, such as wool and silk. The process is also suitable for dyeing

| R | R₁ | R₂ | R₃ | M | m | m+n |
|---|---|---|---|---|---|---|
| C₁₆H₃₃ | CH₃ | H | | Na | 25 | |
| C₁₆H₃₃ | CH₃ | H | —CH₂—⟨⟩ | | 35 | |
| C₁₆H₃₃ | CH₃ | H | —CH₂—CONH₂ | | 30 | |
| C₁₈H₃₅ | —(CH₂CH₂O)ₙ—H | H | | Na | | 33 |
| C₁₈H₃₇ | CH₃ | H | —CH₂—CONH₂ | | 25 | |
| C₁₈H₃₇ | —(CH₂CH₂O)ₙ—CH₂CH₂SO₃Na | H | —CH₃ | | | 20 |
| C₁₈H₃₇ | CH₃ | H | —CH₂—CONH₂ | | 28 | |
| C₁₈H₃₇ | CH₃ | H | —CH₂—⟨⟩ | | 35 | |
| C₁₈H₃₇ | CH₃ | H | —CH₂CH₂OH | | 30 | |
| C₂₀H₃₁ | —(CH₂CH₂O)ₙ—H | H | —CH₂COONa | | | 30 |
| C₁₈H₃₇ | CH₃ | 4.2% CH₃, 95.8% H | —CH₂CONH₂ | | 30 | |
| C₁₈H₃₇ | —(CH₂CH₂O)ₙ—H | 7.2% —⟨⟩, 92.8% H | —CH₃ | | 35 | |

The manufacture of the compounds to be used according to the invention can take place in accordance with processes which are in themselves known. Thus the alkylation products can be converted into the corresponding alcoholates by means of sodium or sodium methylate and subsequently be reacted, using chlorethanesulphonic or bromethanesulphonic acid to give the sulphonate. The compounds can be manufactured more simply if the terminal hydroxyl group of the polyglycol ether chain is converted into esters of inorganic acids, such as those of hydrochloric, hydrobromic or hydriodic acid or of sulphuric acid, or into esters of organic sulphonic acids, such as of benzenesulphonic or toluenesulphonic acid, and these are then reacted with sodium sulphite at elevated temperature, appropriately at 80–150° C.

The quaternisation which is optionally to be carried out can be effected in a known manner with customary alkylating agents, such as, for example, methyl iodide, dimethyl sulphate, ethyl bromide, diethyl sulphate, ethylene chlorhydrin, sodium chloracetate, chloracetic acid methyl ester, chloracetamide or benzyl chloride.

The dyeing of the textile materials which can be dyed with acid dyestuffs and 1:2 metal complex dyestuffs, in the presence of the compounds of Formula I and II to be used in accordance with the invention, can be carried out by introducing the goods to be dyed into a liquor warmed to 40–50° C., which contains the acid dyestuffs and/or the 1:2 metal complex dyestuffs, the compounds of Formulae I or II to be used according to the invention, and acids, for example acetic acid, and then gradually raising the temperature of the dyebath to 100–130° C. and maintaining the bath at this temperature until it is exhausted. It has proved advantageous to pretreat the goods to be dyed with an aqueous liquor which only contains compounds of Formula I or of Formula II and acids, for a short time at 40–50° C. and only then to add the dyestuffs to the liquor at temperatures between 50 and 98° C., subsequently to raise the temperature of the dyebath gradually to 100–130° C. and to maintain the bath at this temperature until it is exhausted.

The amounts in which the compounds to be used according to the invention are added to the dyebaths can vary within wide limits; they can be easily determined by preliminary experiments. In general, amounts of 0.25–3, preferably 0.5–1, percent by weight, relative to the weight of the goods to be dyed, have proved successful.

The dyeing process is suitable for all nitrogen-containing fiber materials which can be dyed with acid dyestuffs and 1:2 metal complex dyestuffs, such as synthetic polyamides, for example hexamethylenediadipate, poly-ε-caprolactam, poly-ω-aminoundecane-acid, basic-modified polyacrylonitriles, but especially natural polyamides, such as wool and silk. The process is also suitable for dyeing mixtures of these nitrogen-containing fiber materials with other fiber materials, for example those of native and regenerated cellulose, polyacrylonitrile or polyesters.

With the aid of the compounds of Formulae I and II to be used according to the invention it is possible to dye textile materials which can be dyed with acid dyestuffs and 1:2 metal complex dyestuffs, in the most diverse processing forms, for example as flocks, tops texturised yarns, spinning tow, yarn, woven fabrics, knitted fabrics or fleece with excellent uniformity using acid dyestuffs and 1:2 metal complex dyestuffs. The advantage of the compounds to be used according to the invention relative to the hitherto known levelling agents consists of the fact that they are suitable both for dyeing with acid dyestuffs and for dyeing with 1:2 metal complex dyestuffs and that therefore nitrogen-containing textile materials can be dyed with a single auxiliary agent even when using combinations of acid dyestuffs and 1:2 metal complex dyestuffs, without leading to edge effects of the 1:2 metal complex dyestuffs and hence to non-uniform dyeings.

The parts indicated in the examples which follow are parts by weight.

EXAMPLE 1

Hanks of wool yarn are introduced at 50° C. using a liquor ratio of 1:30, into a dyeing liquor which per litre contains 2 g. of sodium sulphate (calcined), 1 g. of glacial acetic acid, 0.13 g. of 1:2 chromium complex of the azo dyestuff anthranilic acid→1-phenyl-3-methyl-5-pyrazolone and 0.3 g. of the product A described below. The dyebath is heated to 100° C. over the course of 30 minutes and is subsequently kept at this temperature for 30 minutes. 0.05 g. of dyestuff of formula

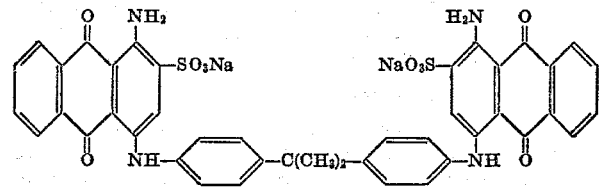

are then added to the dyebath which is heated to 100° C. for a further 30 minutes. In spite of the feeding of dyestuff at the boil, an excellent uniform green dyeing is obtained.

The product A employed had been obtained as follows:

320 parts of a reaction product of 56 parts of methylstearylamine and 264 parts of ethylene oxide were mixed with 23 parts of amidosulphonic acid and stirred for 5 hours at 90° C. After adding 52 parts of anhydrous sodium sulphite and 130 parts of water the mixture was stirred for 24 hours in an autoclave at 120–130° C. The reaction product was separated from the aqueous phase at 70–80° C., concentrated in vacuo in order to remove water and salts completely, and taken up in ethanol. After filtering off the salt and distilling off the alcohol, the salt-free product remained.

An equivalent green dyeing was also obtained if instead of the auxiliary agent employed, the same amount of one of the products B or C described was used.

Product B had been obtained as follows:

45 parts of the anhydrous and salt-free product A were mixed with 3.4 parts of benzyl chloride and stirred for 5 hours at 90–100° C.

Product C had been obtained as follows:

40 parts of the anhydrous and salt-free product A were mixed with 2.2 parts of chloracetamide and stirred for 10 hours at 90–100° C.

EXAMPLE 2

Worsted wool yarn wound on cheeses is treated for 5–10 minutes, using a liquor ratio of 1:15 with a liquor which per litre contains 2 g. of sodium sulphate (calcined) and 1 g. of glacial acetic acid. The liquor is heated to 100° C. over the course of about 15 minutes and 0.6 g. of the product A described in Example 1 are then added to the dyebath at this temperature, followed after a further 5 minutes by 0.7 g. of the 1:2 chromium complex of the azo dyestuff 2-amino-4-ethylsulphonyl-phenol→ 1 - ethylsulphonylamino - 7 - hydroxy - naphthalene. Dyeing is carried out for 60 minutes at the boil and though the dyestuff which in acid solution is difficult to level was added at the boil an excellent uniform grey dyeing was obtained.

EXAMPLE 3

Polyhexamethylenediamineadipate yarn is treated for about 10 minutes at 50° C., using a liquor ratio of 1:15, with a liquor which per litre contains 0.3 g. of trisodium phosphate, 0.6 g. of the product D described below and 0.7 g. of the 1:2 chromium complex of the azo dyestuff 2 - amino - 4 - ethylsulphonylphenol→ 1-ethylsulphonyl-amino-7-hydroxy-naphthalene. The dyebath is heated to 100° C. over the course of 15 minutes and maintained at this temperature for 60 minutes. An excellent uniform grey dyeing is obtained.

The product D used had been obtained as follows:

116 parts of a reaction product of 327 parts of N-[hydroxyethyl]-methyl-stearylamine and 840 parts of ethylene oxide were mixed with 11.5 parts of amidosulphonic acid and stirred for 5 hours at 90° C. The reaction mixture was mixed with 25 parts of anhydrous sodium sulphite and 70 parts of water and stirred for 12 hours at 130–135° C. in an autoclave. After completion of the reaction, the mixture was cooled to 90° C., and the organic phase was separated off, mixed with 12.5 parts of benzyl chloride and stirred for 5 hours at 90° C. The resulting product, which still contains water, gives a clear solution in water.

An equivalent grey dyeing was also obtained if instead of the auxiliary agent D employed the same amount of the auxiliary agent E described below was used.

Product E had been obtained as follows:

137 parts of a product obtained by reaction of 269 parts of stearylamine with 1,100 parts of ethylene oxide were mixed with 11.5 parts of amidosulphonic acid at 90° C. and stirred for 5 hours at 90° C. The reaction mixture was treated with 25 parts of anhydrous sodium sulphite and 70 parts of water and stirred for 15 hours at 135° C. in an autoclave. The organic phase was then separated off, freed of remnants of water in vacuo, mixed with 12 parts of benzyl chloride and stirred for 5 hours at 90° C. On dissolving the reaction product in alcohol, separating off the salt and distilling off the alcohol, a salt-free product was obtained, which gave a clear solution in water.

EXAMPLE 4

A liquor which per litre contains 2 g. of sodium sulphate (calcined), 0.8 g. of glacial acetic acid, 0.5 g. of dyestuff of formula

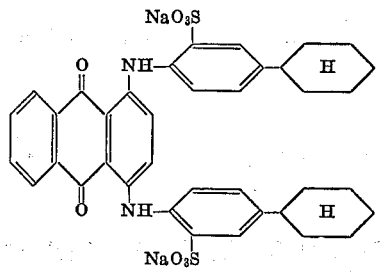

0.25 g. of 1:2 chromium complex of the azo dyestuff anthranilic acid→ 1-phenyl-3-methyl-5-pyrazolone and 0.5 g. of the product C described in Example 1 is introduced into an open, round dyeing apparatus. After heating the liquor to 50° C., a material carrier filled with loose wool is introduced into the dyeing appaartus. The amount of wool is so chosen that a liquor ratio of 1:20 results. The dyebath is heated to 100° C. over the course of 45 minutes and kept at this temperature for 60 minutes. An excellent uniform yellow-green dyeing is obtained.

An equally uniform yellow-green dyeing was obtained if instead of the product C employed, the same amount of one of the products A or B described in Example 1 or of one of the products F or G described below was used.

Product F had been obtained as follows:

318 parts of the reaction product of 267 parts of oleylamine with 1,320 parts of ethylene oxide were stirred for 5 hours at 90–100° C. with 20 parts of urea and 41 parts of amidosulphonic acid. The reaction mixture was mixed with a solution of 102 parts of anhydrous sodium sulphite in 460 parts of water and stirred for 12 hours in an autoclave at 120;130° C. The reaction product was freed of water in vacuo and freed of the salt by extraction with methanol. After distilling off the methanol, the reaction product was mixed with 18 parts of chloracetamide and stirred for 10 hours at 90–100° C. A product which gave a clear solution in water was obtained.

Product G had been obtained as follows:

332 parts of a product which had been obtained by reaction of 56 parts of methylstearylamine with 12 parts of propylene oxide and subsequently with 264 parts of ethylene oxide, were mixed with 23 parts of amidosulphonic acid and stirred for 5 hours at 90° C. After adding 52 parts of anhydrous sodium sulphite and 130 parts of water, the mixture was stirred for 24 hours in an autoclave at 120–130 C. The reaction product was separated from the aqueous phase at 80° C., subsequently mixed with 18.7 parts of chloroacetamide, and stirred for 10 hours at 90° C. In order to remove water and salts completely, the product was concentrated in vacuo and taken up in methanol. After filtering off the salt and distilling off the methanol, a water-soluble, salt-free and anhydrous product remained.

EXAMPLE 5

A woven wool fabric which had been dyed unevenly with 2.5% of the 1:2 chromium complex of the azo dyestuff 2-amino-4-ethylsulphonyl-phenol→1-ethylsulphonyl-amino-7-hydroxynaphthalene, is treated for 45 minutes at the boil, on a winch, using a liquor ratio of 1:40, with a liquor which per litre contains 2 g. of sodium sulphate (calcined), 0.7 g. of glacial acetic acid, 0.07 g. of the above mentioned 1:2 chromium complex dyestuff and 0.25 g. of the product A described in Example 1. As a result of this treatment, the previously unevenly dyed woven wool fabric is completely levelled.

We claim:

1. Process for dyeing nitrogen containing fiber material with a 1:2 metal complex dyestuff, an acid dyestuff or a mixture of 1:2 metal complex dyestuff and acid dyestuff in the presence of an amine containing glycol ether group in which said amine containing glycol ether group consists essentially of a compound of the formula (A)
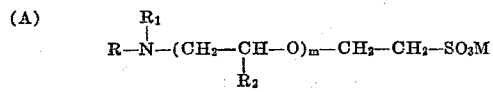

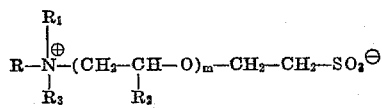

in which

R is $C_{12}$-$C_{22}$-alkyl, $C_{12}$-$C_{22}$-alkenyl or $C_{12}$-$C_{22}$-cycloalkyl;
$R_1$ is methyl,
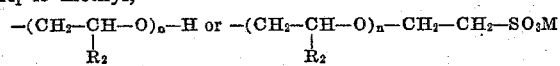
$R_2$ is hydrogen, methyl, ethyl, or phenyl;
M is a cation;
the sum of $m+n$ is 5–70, with the proviso that at least 80% of the alkylene oxide units contained in the molecule are ethylene oxide units.

2. The process of claim 1 in which R is $C_{16}$-$C_{20}$-alkyl or $C_{16}$-$C_{20}$-alkenyl; $R_2$ is hydrogen; and the sum of $m$ and $n$ is 15 to 50.

3. The process of claim 1 in which the nitrogen containing fiber material is a natural polyamide.

4. The process of claim 1 in which the dyestuff is a 1:2 metal complex dyestuff or a mixture thereof with an acid dyestuff.

5. The process of claim 1 in which the dyestuff is a mixture of a 1:2 metal complex dyestuff and an acid dyestuff.

6. The fiber dyed by the process of claim 1.

References Cited

UNITED STATES PATENTS 3,529,922  9/1970  Berger et al. _____ 8—54
2,963,513  12/1960  Albrecht _____ 8—88 X
3,307,901  3/1967  Bindler et al. _____ 8—84 X GEORGE F. LESMES, Primary Examiner T. J. HERBERT, Jr., Assistant Examiner U.S. Cl. X.R.

8—43, 86, 172, 173; 260—509, 513